(No Model.)

F. ARMSTRONG.
WRENCH.

No. 274,544. Patented Mar. 27, 1883.

Attest:
Walter Fowler
A. M. Wooster.

Inventor:
Frank Armstrong
by attys
Wooster & Smith

UNITED STATES PATENT OFFICE.

FRANK ARMSTRONG, OF BRIDGEPORT, CONNECTICUT.

WRENCH.

SPECIFICATION forming part of Letters Patent No. 274,544, dated March 27, 1883.

Application filed February 2, 1883. (No model.)

*To all whom it may concern:*

Be it known that I, FRANK ARMSTRONG, a citizen of the United States, residing at Bridgeport, in the county of Fairfield and State of Connecticut, have invented certain new and useful Improvements in Wrenches; and I do hereby declare the following to be a full, clear, and exact description of the invention, such as will enable others skilled in the art to which it appertains to make and use the same.

My invention relates to wrenches, and has for its object to secure a position and rigid grip, in connection with greater ease and rapidity of action, than has ever before been attained, while at the same time the parts shall be few in number, strongly made, and the device, as a whole, economical in cost and not liable to get out of order; and with these ends in view my invention consists in certain details of construction, which constitute an improvement on the wrench patented to D. P. Foster, No. 222,484, December 9, 1879, all of which will be hereinafter fully described, and specifically designated by the claim.

In order that those skilled in the art to which my invention appertains may understand more fully how to make and use my improvement, I will proceed to describe the same in detail, referring by letters to the accompanying drawings, forming part of this specification, in which—

Figure 1:
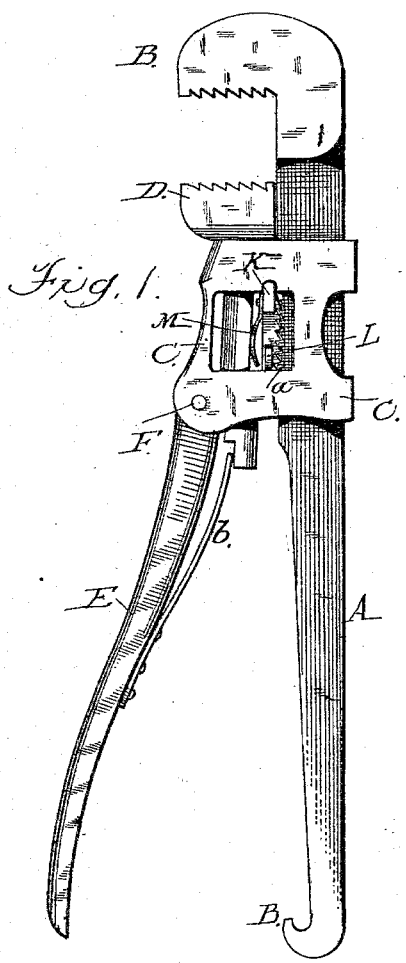
Figure 2:
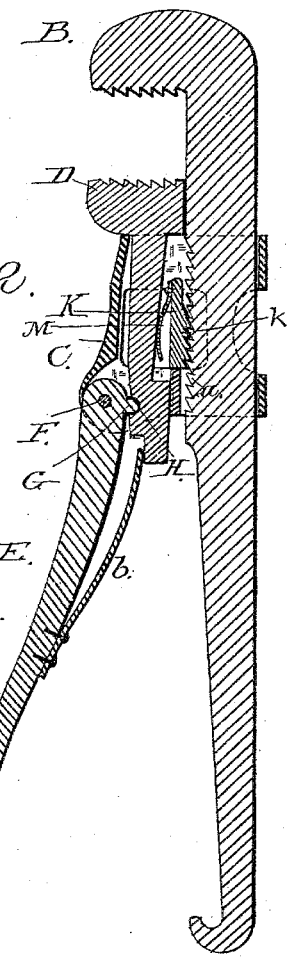
Figure 3:
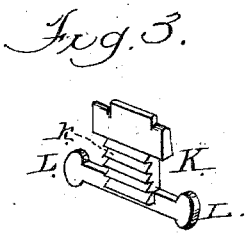

Figure 1 is a side elevation of my improved wrench; Fig. 2, a section of the same, and Fig. 3 a detail view.

Similar letters denote like parts in the several figures of the drawings.

A represents the stationary bar, which is provided at its end with the usual jaw, B, and has upon its inner edge ratchet-teeth $a$, inclining backward. A frame, C, slides easily over this bar, and carries with it the movable jaw D and the handle E, which is pivoted to the frame C at F, and has a lug or cam, G, which engages a corresponding depression, H, in the sliding bar for the purpose of giving the movable jaw a forward and backward motion independent of the other parts. A spring, $b$, throws the handle up when it is free, and causes it to draw back the movable jaw in contact with the sliding frame and keep it there as long as the handle is free. These parts correspond substantially to those shown in the patent above referred to.

Within the sliding-frame, and engaging in a socket in the front part thereof, or pivoted thereto, I place a dog, K, having ratchet-teeth $k$ in its under side, which engage with those on the inner edge of the stationary bar. From the opposite sides of the dog two lugs or finger-pieces, L L, project through the open sides of the sliding frame. Above the dog is arranged a spring, M, which forces the teeth on the dog into constant engagement with those upon the stationary bar. Both sets of teeth incline backward, but are straight on their forward edges, so that a rigid obstruction is always presented to the backward movement of the jaw D, unless the dog shall be lifted against the force of the spring M.

The faces of the jaws may be left smooth or roughened, as may best suit the purpose for which the wrench is intended.

It will be seen that the adjustment of my improved wrench is practically instantaneous, it being only necessary to slide the movable jaw along the bar until the jaws touch the article to be grasped. When adjusted, the pressure upon the handle E through the action of the cam G forces the movable jaw still further forward, causing it to firmly grip the article, no matter what may be its shape. This latter movement is independent of the action of the dog and spring. To move the jaw D backward, it is only necessary to lift the dog by means of finger-pieces L L.

As a modification of this device, the ratchet-teeth $a$ might be made on the opposite side of the bar A, and the location of the dog K changed accordingly, making the operative parts on the outside of the stationary bar instead of on the inside, as shown; but the form shown is more compact and deemed preferable.

Having thus described my invention, what I claim as new, and desire to secure by Letters Patent, is—

In a wrench, the stationary bar having ratchet-teeth and a jaw, in combination with a sliding frame carrying an independently-movable jaw operated by the handle, and a dog operating independently of the handle, and having ratchet-teeth which engage with those upon the bar, whereby the sliding frame is rigidly held when adjusted, but the jaw is free to be operated by the handle.

In testimony whereof I affix my signature in presence of two witnesses.

FRANK ARMSTRONG.

Witnesses:
W. T. HAVILAND,
F. W. SMITH, Jr.